United States Patent [19]

Zettner et al.

[11] Patent Number: 5,617,937

[45] Date of Patent: Apr. 8, 1997

[54] ROTATION PREVENTING DEVICE FOR A PLASTIC CAGE OF AN OVERRUNNING CLUTCH

[75] Inventors: Herbert Zettner, Herzogenaurach; Johann Stark, Höchstadt, both of Germany

[73] Assignee: Ina Walzlager Schaeffler KG, Germany

[21] Appl. No.: 545,519

[22] Filed: Oct. 19, 1995

[30] Foreign Application Priority Data

Nov. 30, 1994 [DE] Germany ............... 44 42 404.3

[51] Int. Cl.[6] .................................................. F16D 41/06
[52] U.S. Cl. ................... 192/45; 192/41 R; 188/82.84; 384/576; 384/580
[58] Field of Search ......................... 192/45, 41 R; 188/82.1, 82.84; 384/559, 560, 572, 576, 580

[56] References Cited

U.S. PATENT DOCUMENTS

| 3,118,525 | 1/1964 | Fischer . | |
|---|---|---|---|
| 3,500,977 | 3/1970 | Gehrke . | |
| 3,993,176 | 11/1976 | Marola et al. | 192/45 |
| 5,156,246 | 10/1992 | Iga et al. . | |
| 5,273,144 | 12/1993 | Papania | 192/45 |

FOREIGN PATENT DOCUMENTS

| 0469599 | 2/1992 | European Pat. Off. . |
|---|---|---|
| 2017706 | 10/1971 | Germany . |
| 1750493 | 4/1972 | Germany . |
| 1908137 | 4/1975 | Germany . |
| 2719685 | 11/1978 | Germany . |
| 3241053 | 5/1984 | Germany . |
| 4216055 | 11/1993 | Germany . |

OTHER PUBLICATIONS

The Torrington Company, (Oct. 1, 1964), pp. 2510–2520, Article in German —.

Primary Examiner—Andrea L. Pitts
Attorney, Agent, or Firm—Bierman and Muserlian

[57] ABSTRACT

An overrunning clutch comprising two concentric machine components (1,2) rotatable relative to each other and having locking surfaces (13,14) formed on their mutually facing peripheral surfaces, and, arranged therebetween, a plastic cage (4) comprising end rings (15) connected to each other by crossbars (16), pockets (17) for locking elements (3) spring-urged against the locking surfaces (13,14) being formed between circumferentially adjacent crossbars (16), the plastic cage (4) further comprising at least one radial projection (19) which engages into a recess (20) of one of the machine components (2) to prevent rotation of the plastic cage (4) relative to this machine component (2), characterized in that the radial projection (19) is arranged on a crossbar (16).

7 Claims, 2 Drawing Sheets

ROTATION PREVENTING DEVICE FOR A PLASTIC CAGE OF AN OVERRUNNING CLUTCH

STATE OF THE ART

An overrunning clutch comprising two concentric machine components rotatable relative to each other and having locking surfaces formed on their mutually facing peripheral surfaces, and, arranged therebetween, a plastic cage comprising end rings connected to each other by crossbars, pockets for locking elements spring-urged against the locking surfaces being formed between circumferentially adjacent crossbars, the plastic cage further comprising at least one radial projection which engages into a recess of one of the machine components to prevent rotation of the plastic cage relative to this machine component is known, for example, from U.S. Pat. No. 3,500,977. The outer peripheral surfaces of the end rings of the plastic cage of this clutch comprise projections which engage into associated recesses of the outer machine component to secure the plastic cage against rotation relative to this machine component.

The cross-section of the crossbars varies depending on the size of the plastic cage and the number of locking elements. Generally used locking elements are either sprags or rollers and U.S. Pat. No. 3,500,977 uses locking rollers. Forces acting in a circumferentially vibrating system are transmitted via the locking elements to the plastic cage of the overrunning clutch which is mounted, for instance, in a circumferentially vibrating system are transmitted via the crossbars into the end rings and finally into the outer machine component. Under certain circumstances, the crossbars may be subjected to circumferentially acting bending loads resulting in undesired displacements of the crossbars in a circumferential direction or even in their fracture.

OBJECT OF THE INVENTION

It is an object of the invention to provide an improved overrunning clutch of the generic type so that undesired displacements of the crossbars, at least in the circumferential directions, are avoided in a simple manner.

This and other objects and advantages of the invention will become obvious from the following detailed description.

SUMMARY OF THE INVENTION

An overrunning clutch of the invention comprising two concentric machine components (1,2) rotatable relative to each other and having locking surfaces (13,14) formed on their mutually facing peripheral surfaces, and, arranged therebetween, a plastic cage (4) comprising end rings (15) connected to each other by crossbars (16), pockets (17) for locking elements (3) spring-urged against the locking surfaces (13,14) being formed between circumferentially adjacent crossbars (16), the plastic cage (4) further comprising at least one radial projection (19) which engages into a recess (20) of one of the machine components (2) to prevent rotation of the plastic cage (4) relative to this machine component (2), is characterized in that the radial projection (19) is arranged on a crossbar (16).

The invention achieves this object when the radial projection is arranged on a crossbar. Due to the fact that the radial projection engages into the recess and is therefore not circumferentially displaceable relative to this machine component, the crossbar on which the radial projection is fixed is also not displaceable circumferentially to an undesired large extent relative to this machine component. If, for example, the radial projection is arranged in the central region of the crossbar, a circumferential load acting on the crossbar is transmitted directly via the radial projection into the machine component. In the plastic cage of the prior art, however, this load is first transmitted into the end rings and then into the machine component with the result that due to the prevailing abutment relationships, a higher bending moment acts on the crossbar of the prior art than in the overrunning clutch of the invention. It is conceivable to make the radial projection in the form of a separate component fixed on the crossbar.

If locking rollers are used as locking elements, the improved overrunning clutch of the invention can be advantageously used in cases in which the overrunning clutch is subjected to vibrations in the circumferential direction. Since locking rollers, unlike sprags, are displaced only in the circumferential directions and do not have to be pivotable about a tilting axis, they offer more advantages when subjected to vibrations because of the simpler kinematic processes involved. These vibrations are also transmitted to the crossbars which, however, cannot vibrate in the circumferential direction due to the engagement in the recesses. Such a practical case of use is given, for example, when the overrunning clutch of the invention is arranged between an axle and a belt pulley of a control or auxiliary unit drive of an internal combustion engine arranged thereon. The forces of acceleration and deceleration transmitted to the belt as a result of the cyclic irregularities of the camshaft are transmitted to the belt pulley with the aforementioned effects on the overrunning clutch.

Advantageously, the recess is configured as an axial groove into which the radial projection of the crossbar locks by positive engagement. In this case, in addition to the already mentioned advantages, the crossbar is also supported in one radial direction if it bears against the groove bottom of the axial groove.

The two machine components forming the overrunning clutch are advantageously made as thin-walled bushes, particularly by deep-drawing, the locking surfaces being formed by a smooth cylindrical locking face of the outer bush and by locking ramps arranged successively in the circumferential direction on the inner bush. Such an overrunning clutch can be manufactured economically because no chip removal is required.

According to another advantageous feature of the invention, the inner bush comprises a smooth cylindrical inner peripheral surface and the axial groove is made between adjacent locking ramps with one axial end of the axial groove being open and the other axial end being closed by a radially projecting portion of the inner bush. The plastic cage is pushed onto the inner bush without any problem from the open end of the axial groove. For this, the radial projection of the cage is inserted into the axial groove and reaches its final position in the axial groove without any noteworthy deformation. With an appropriate arrangement of the radial projection, the closed end of the axial groove also serves as an axial stop for the plastic cage.

Raceways for rolling elements are formed on both sides of the locking surfaces on the mutually facing peripheral surfaces of the two bushes. Such a rolling bearing-mounted overrunning clutch is advantageously used when, for example, the outer bush is arranged in a central bore of a belt pulley and the inner bush is arranged on an axle, and no separate bearings are provided between the belt pulley and the axle.

According to another advantageous embodiment of the invention, a groove bottom of the axial groove extends tangentially of a circle which is concentric with the bushes, and the diameter of one of the two raceways formed on the inner bush is larger than the diameter of the concentric circle, while the diameter of the second raceway formed on the inner bush is smaller than or at most equal to the diameter of the concentric circle. Such a configuration facilitates the slipping-on of the plastic cage onto the inner bush because the radial projection cannot clamp on the smaller raceway diameter and the axial groove is open at this end. The raceway with the larger diameter being situated at the other end of the axial groove, it is guaranteed that the axial groove is closed at this end.

Advantageously, the radial projection extends radially inwards beyond the end rings while overlapping them in the axial direction, and the end rings, the crossbar and the radial projection are made in a single piece with one another. Besides the possibility of simple manufacturing since a radial enlargement of the crossbar can be made in a simple manner with the injection mold, the rigidity of the radially enlarged crossbar, with a constant cross-section along its entire length, is also clearly increased. If the radially enlarged crossbar is made to fit snugly into the contour of the recess, it is reliably supported in both circumferential directions and in one radial direction. The load on the radial projection is uniformly distributed over its entire axial length so that high local loading does not occur.

DETAILED DESCRIPTION OF THE INVENTION

Figure 1:
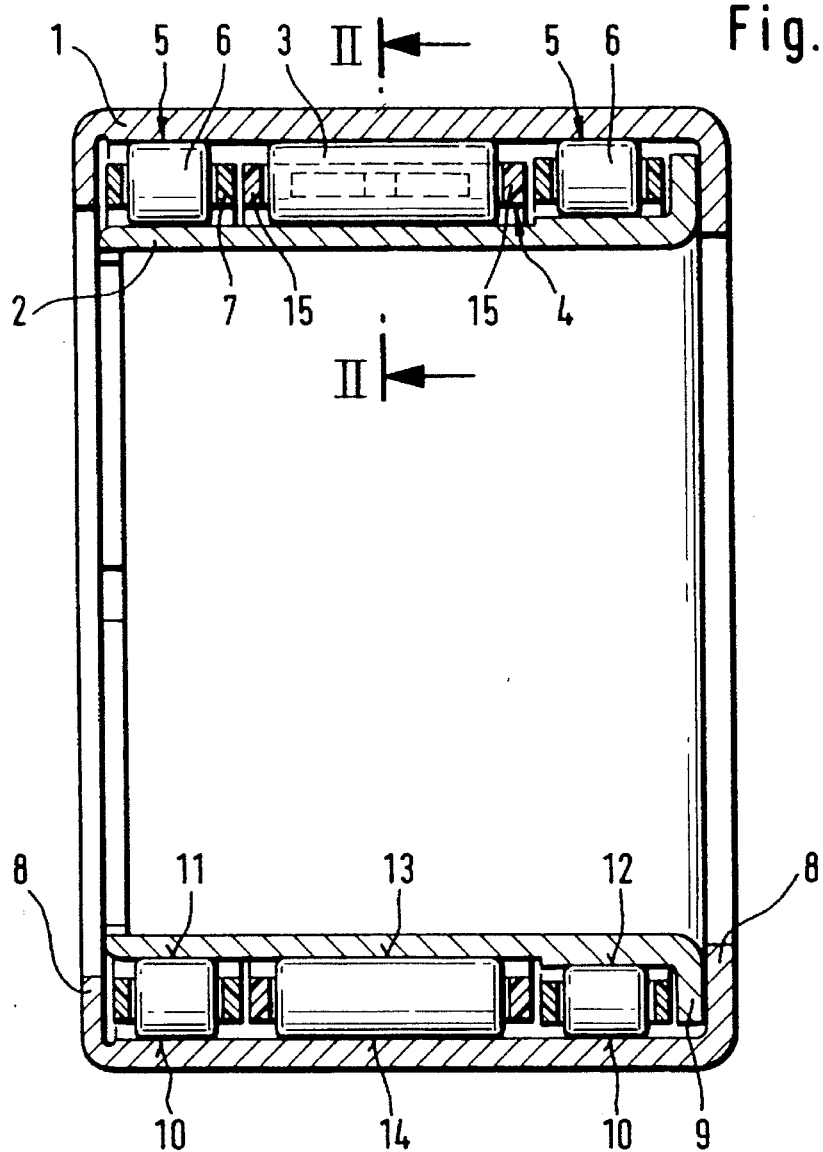
FIG. 1 is a longitudinal cross-section through a locking roller overrunning clutch of the invention.
Figure 2:
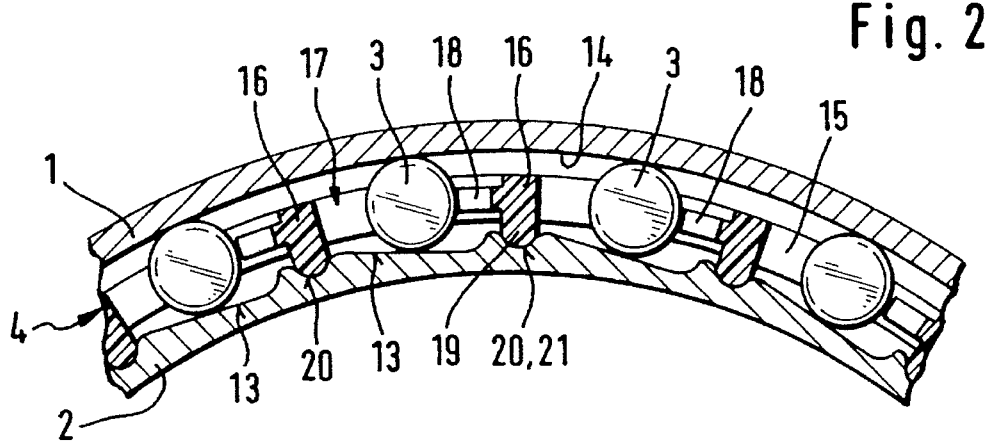
FIG. 2 is a partial representation of the locking roller over-running clutch of FIG. 1 in a transverse cross-section.

In the locking roller overrunning clutch of FIG. 1, locking rollers (3) retained in a plastic cage (4) are arranged circumferentially spaced between an outer bush (1) and an inner bush (2). On each side of the locking rollers (3), i.e. on each side of the cage (4), there is arranged a roller bearing (5) comprising rollers (6) and a roller cage (7). At each of its ends, the outer bush (1) comprises radially inward oriented rims (8), while the inner bush (2) comprises, only at one of its ends, a radially outward oriented rim (9). In the region of the rollers (6), the mutually facing peripheral surfaces of the two bushes (1,2) comprises outer raceways (10) and inner raceways (11,12) respectively, and these inner raceways (11,12) have differing raceway diameters. In the region of the locking rollers (3), there are formed locking ramps (13) on the inner bush (2) and a smooth cylindrical locking face (14) on the outer bush (1). The locking ramps (13) can be better seen in FIG. 2.

The plastic cage (4) comprises axially adjacent end rings (15) which are integrally connected to each other by a plurality of circumferentially spaced crossbars (16), only the axially rear end ring (15) being visible in this view. It can be further seen in FIG. 2 that pockets (17) for the locking rollers (3) are formed between successive crossbars (16). Compression springs (18) are supported at one end of the crossbars (16), while their other ends urge the locking rollers (3) against the locking ramps (13) and the smooth cylindrical locking face (14). An axial groove (20) is disposed between every two successive locking ramps (13), and an integrally formed radial projection (19) of the crossbar (16) locks into the axial groove (20) by positive engagement so that the plastic cage (4) cannot rotate relative to the inner bush (2).

Figure 3:
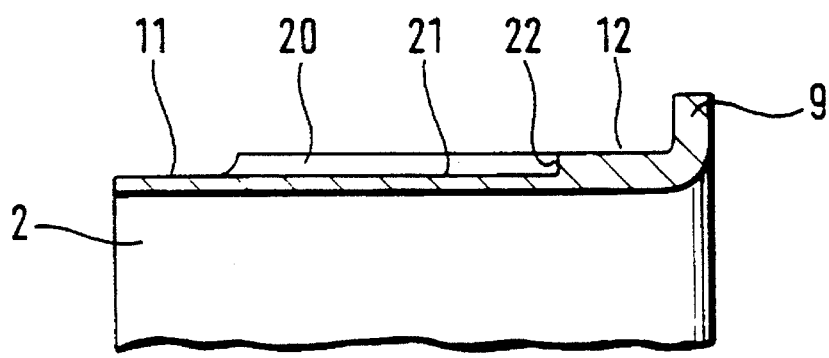
FIG. 3 is a longitudinal cross-section of the inner bush of the locking roller overrunning clutch of FIG. 1.

FIG. 3 is a fragmentary view of the inner bush (2) with the raceways (11,12) and the axial groove (20) whose grove bottom (21) is situated on the same radial plane as the raceway diameter of the raceway (11). The raceway diameter of the raceway (12), in contrast, is larger than the raceway diameter of the raceway (11). Thus, the axial groove (20) is closed at its end towards the raceway (12) due to the radial step (22) at the transition between the groove bottom (21) and the raceway (12), while at its ends towards the raceway (11), the axial groove (20) is open. In this way, a simple mounting of the plastic cage (4) on the inner bush (2) is guaranteed.

Figure 4:
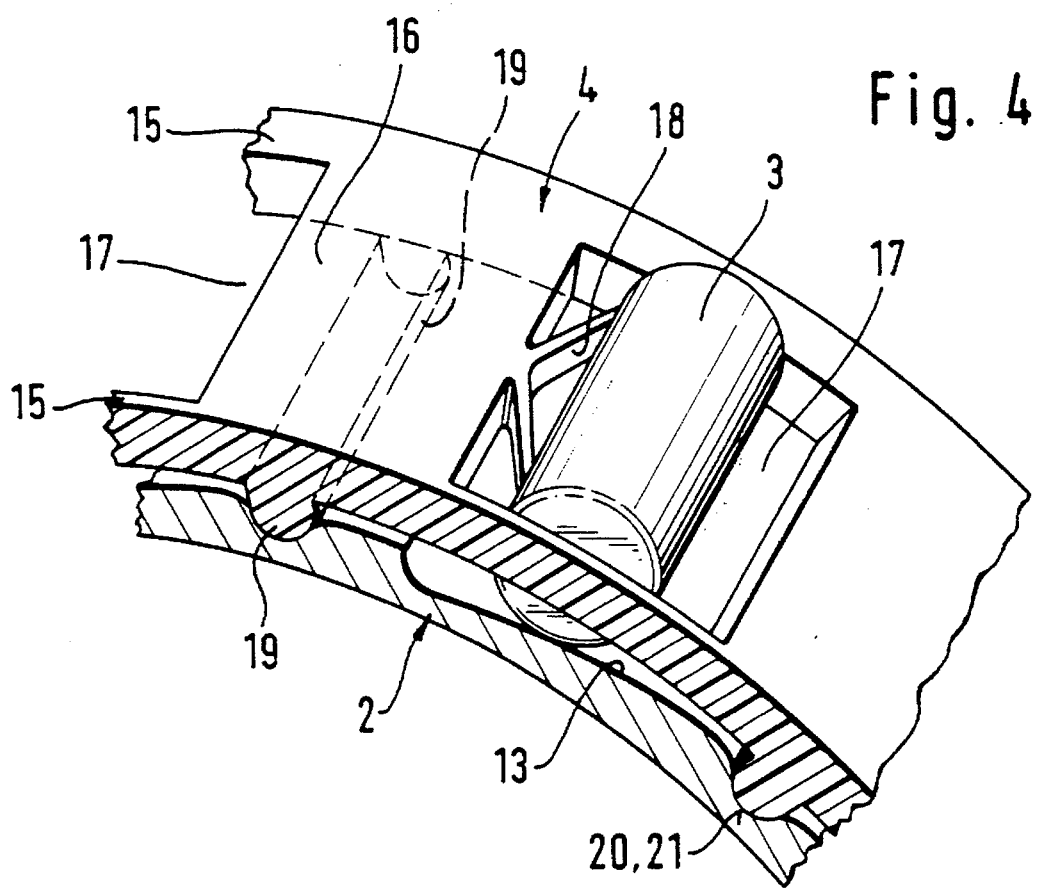
FIG. 4 is a perspective partial view of a second embodiment of the overrunning clutch of the invention.

FIG. 4 shows a perspective view of another embodiment of the locking roller overrunning clutch of the invention but without the outer bush. The only difference between this locking roller overrunning clutch and the one described above is that the crossbars (16) are made wider in the circumferential direction with the narrow radial projection (19) extending likewise radially inwards.

Various modifications of the overrunning clutch of the invention may be made without departing from the spirit or scope thereof and it is to be understood that the invention is intended to be limited only as defined in the appended claims.

What we claim is:

1. An overrunning clutch comprising two concentric thin-walled bushes (1,2) rotatable relative to each other and having locking surfaces (13,14) formed on their mutually facing peripheral surfaces, and, arranged therebetween, a plastic cage (4) comprising end rings (15) connected to each other by crossbars (16), pockets (17) for locking elements (3) spring-urged against the locking surfaces (13,14) being formed between circumferentially adjacent crossbars (16), the plastic cage (4) further comprising at least one radial projection (19) which engages into a recess (20) of one of the thin-walled bushes (2) to prevent rotation of the plastic cage (4) relative to this thin-walled bush (2), characterized in that the radial projection (19) is arranged on a crossbar (16), the locking surfaces being formed by a smooth cylindrical locking surface (14) of the outer bush (1) and by locking ramp surfaces (13) arranged successively in circumferential direction on the inner bush (2), the inner bush (2) comprises a smooth cylindrical inner peripheral surface and the axial groove (20) is made between, adjacent locking surfaces (13) with one axial end of the axial groove (20) being open and another axial end of the axial groove (20) being closed by a radially projecting portion (22) of the inner bush (2).

2. An overrunning clutch of claim 1 wherein the locking elements are locking rollers (3).

3. An overrunning clutch of claim 1 wherein the recess is configured as an axial groove (20) into which the radial projection (19) of the crossbar (16) locks by positive engagement.

4. An overrunning clutch of claim 1 wherein the thin-walled bushes are made by deep-drawing.

5. An overrunning clutch of claim 1 wherein raceways (10,11,12) for rolling elements (6) are formed on the two bushes (1,2) on their mutually facing peripheral surfaces on both sides of the locking surfaces (13,14).

6. An overrunning clutch of claim 5 wherein a groove bottom (21) of the axial groove (20) extends tangentially of a circle which is concentric with the bushes (1,2), and a diameter of one of two raceways (11,12) formed on the inner bush (2) is larger than a diameter of the concentric circle, while a diameter of the other of the two raceways (11,12) formed on the inner bush (2) is smaller than or at most equal to the diameter of the concentric circle.

7. An overrunning clutch of claim 1 wherein the radial projection (19) extends radially inwards beyond the end rings (15) while overlapping the end rings (15) in axial direction, and the end rings (15), the crossbar (16) and the radial projection (19) are made in one piece with one another.

* * * * *